(12) United States Patent
Ji et al.

(10) Patent No.: US 7,241,474 B2
(45) Date of Patent: Jul. 10, 2007

(54) PREPARATION OF PATTERNED DIFFUSION MEDIA

(75) Inventors: Chunxin Ji, Rochester, NY (US); Michael R Schoeneweiss, W. Henrietta, NY (US); Mark F Mathias, Pittsford, NY (US); Joerg Roth, Trebur (DE)

(73) Assignee: General Motors Corporation, Detroit, MI (US)

( * ) Notice: Subject to any disclaimer, the term of this patent is extended or adjusted under 35 U.S.C. 154(b) by 360 days.

(21) Appl. No.: 10/824,032

(22) Filed: Apr. 14, 2004

(65) Prior Publication Data

US 2005/0233080 A1    Oct. 20, 2005

(51) Int. Cl.
    *B05D 1/32* (2006.01)
(52) U.S. Cl. .............. 427/243; 427/272; 427/277; 427/282; 427/288; 427/391
(58) Field of Classification Search ........ 427/282, 427/272, 277, 288, 243, 355, 391
    See application file for complete search history.

(56) References Cited

U.S. PATENT DOCUMENTS

| | | | |
|---|---|---|---|
| 4,038,463 A | | 7/1977 | Lamarine et al. |
| 4,931,168 A | | 6/1990 | Watanabe et al. |
| 5,104,497 A | * | 4/1992 | Tetzlaff et al. .......... 205/413 |
| 5,998,058 A | | 12/1999 | Fredley |
| 6,083,638 A | | 7/2000 | Taniguchi et al. |
| 6,365,293 B1 | | 4/2002 | Isono et al. |
| 6,395,325 B1 | * | 5/2002 | Hedge et al. ............ 427/2.11 |
| 2003/0068544 A1 | * | 4/2003 | Cisar et al. ............ 429/40 |
| 2004/0137311 A1 | * | 7/2004 | Mathias et al. .......... 429/44 |

FOREIGN PATENT DOCUMENTS

EP    0 846 347 B1    6/2000

OTHER PUBLICATIONS

International Search Report dated Jul. 17, 2006 for Appln. No. PCT/US05/02851 filed Feb. 2, 2005 corresponding to this application.

* cited by examiner

*Primary Examiner*—Kirsten Jolley
(74) *Attorney, Agent, or Firm*—Harness, Dickey & Pierce, P.L.C.

(57) ABSTRACT

Gas diffusion media for use in fuel cells are provided that contain a pattern of deposited hydrophobic polymer such that less than 100% of the surface of the diffusion media is covered with hydrophobic polymer. The media are made by first wetting a sheet of carbon fiber paper in an aqueous emulsion of the hydrophobic polymer. The wetted sheet is contacted with a pattern member containing one or more openings oriented to correspond to a predetermined or desired pattern of hydrophobic polymer deposition. While still in contact with the pattern member, the sheet is heated or otherwise treated to cause evaporation of the water from the sheet. Evaporation while in contact with the pattern member takes place in such a way that hydrophobic polymer is concentrated in the sheet at the openings of the pattern member by the process of evaporation.

35 Claims, 3 Drawing Sheets

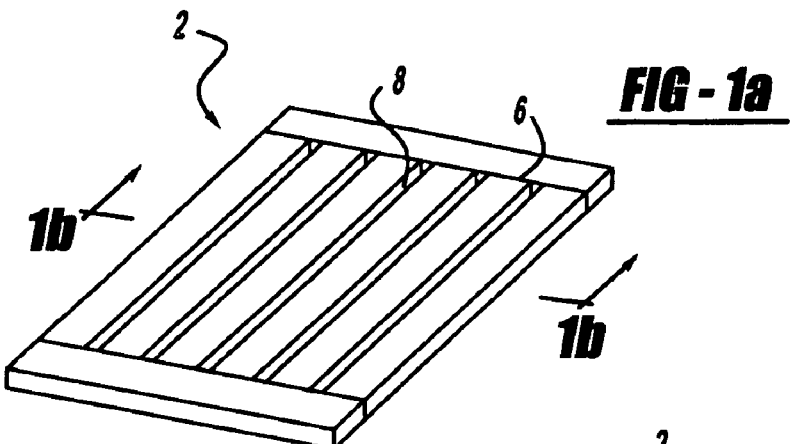
FIG - 1a
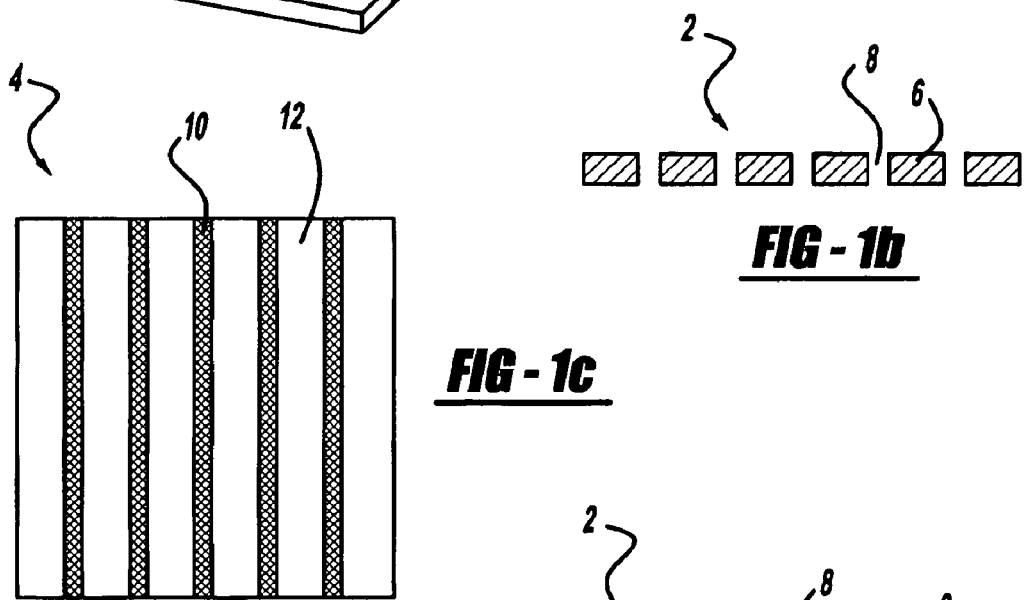
FIG - 1b
FIG - 1c
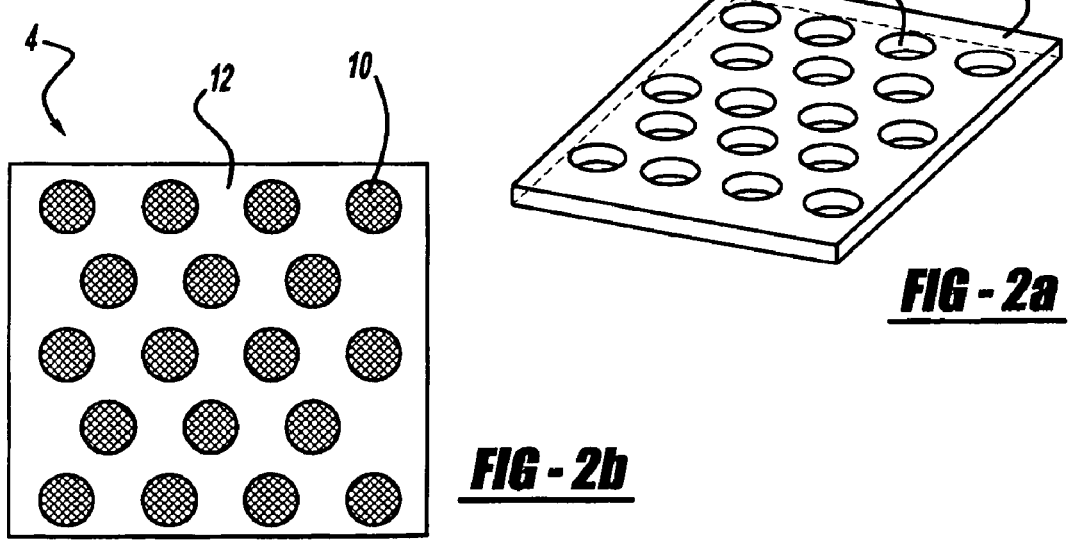
FIG - 2a
FIG - 2b

PREPARATION OF PATTERNED DIFFUSION MEDIA

FIELD OF THE INVENTION

This invention relates to fuel cells and methods for improving water management during operation of the fuel cells. It further relates to methods for depositing hydrophobic material onto diffusion media for use in fuel cells.

BACKGROUND OF THE INVENTION

Fuel cells are increasingly being used as power sources for electric vehicles and other applications. An exemplary fuel cell has a membrane electrode assembly (MEA) with catalytic electrodes and a proton exchange membrane formed between the electrodes. During operation of the fuel cell, water is generated at the cathode electrode based on electrode chemical reactions between hydrogen and oxygen occurring within the MEA. Efficient operation of a fuel cell depends on the ability to provide effective water management in the system.

Gas diffusion media plays an important role in PEM fuel cells. In general, diffusion media needs to wick product water away from the cathode catalyst layer while maintaining reactant gas flow from the gas flow channels through to the catalyst layer. In addition, the proton exchange membrane between the electrodes works best when it is fully hydrated. Accordingly, one of the most important functions of the gas diffusion media is to provide water management during fuel cell operation.

For best water management, it is desirable to provide a gas diffusion medium having a desirable balance of hydrophilic and hydrophobic properties. By providing gas diffusion media with a proper balance of hydrophilic and hydrophobic properties, it is possible to prevent flooding in the cell due to excessive accumulation of water in the gas pores while maintaining proper hydration of the proton exchange membrane.

Accordingly, it would be desirable to provide gas diffusion media having improved balance of hydrophobic and hydrophilic properties that could be exploited to provide efficient water management in fuel cells.

SUMMARY OF THE INVENTION

In view of the above, the present invention provides methods of depositing hydrophobic materials such as polytetrafluoroethylene onto such diffusion media so that the hydrophobic and hydrophilic regions can be precisely positioned in order to obtain optimum fuel cell efficiency.

According to one embodiment of the invention, gas diffusion media for use in fuel cells are provided that contain a pattern of deposited hydrophobic polymers, such that less than 100% of the surface of the diffusion media is covered with hydrophobic polymer. The invention also provides a method for depositing hydrophobic polymer onto such a sheet. The hydrophobic polymer is desirably a fluorocarbon polymer and more desirably a fluororesin. The invention is exemplified by use of a fluororesin but is not limited thereby. The terms fluororesin and fluorocarbon polymer are often used interchangeably by those skilled in the art. The method involves first wetting a sheet of carbon fiber paper in an aqueous emulsion of the hydrophobic polymer. Thereafter the wetted sheet is contacted with a pattern member containing one or more openings oriented to correspond to a predetermined or desired pattern of hydrophobic polymer deposition. While still in contact with the pattern member, the sheet is heated or otherwise treated to cause evaporation of the solvent from the sheet. Evaporation while in contact with the pattern member takes place in such a way that hydrophobic polymer is concentrated in the sheet at the openings of the pattern member by the process of evaporation.

In another variation of the method, the carbon fiber paper sheet may first be wetted with an aqueous emulsion comprising water and hydrophobic polymer particles. Thereafter, the wetted sheet is contacted with a pattern member by a process of hot pressing and water is evaporated from the sheet while in contact with the pattern member. As before, water is evaporated from the sheet in such a way that the hydrophobic polymer particles are concentrated in the sheet at locations corresponding to the locations of openings in the pattern member.

In preferred embodiments, the pattern member consists of a screen characterized by a more or less regular pattern of openings in an essentially planar pattern member.

In some embodiments, the contacting step comprises holding the sheet between two mold surfaces, wherein the two molds can have the same or different patterns. In such embodiments, identical or different patterns of hydrophobic polymer deposition may be provided on the two sides of the carbon sheet. Water may be evaporated from the sheet by heating, by drawing a slight vacuum, or a combination of the two. After water is completely removed from the wet sheet, the sheet is cured at elevated temperature. The patterns formed during the drying process remain unchanged after high temperature curing.

The pattern members are made from materials impermeable to water, in which a plurality of openings are provided to define a pattern of hydrophobic polymer deposition on the sheet through evaporation through the openings. In preferred embodiments, the openings comprise 10–90% of the area of the pattern member, so that the sheets may be coated over 10–90% of its area with hydrophobic polymer. In other preferred embodiments, 10–60% of the sheet is coated, preferably 10–50%.

In processes where the sheet is contacted with two mold surfaces, a pattern of hydrophobic polymer may be deposited on both sides of the sheet if both mold surfaces comprise openings. By contacting the wetted sheet with a pattern member on only one side during evaporation of the water, a gas diffusion medium may be produced having a pattern of hydrophobic polymer deposition on one side and a homogenous covering of hydrophobic polymer on the other. Alternatively, by contacting the sheet in a mold or hot press operation where only one side of the sheet is contacted with a pattern member comprising holes and the other side is against a solid mold, it is possible to produce gas diffusion media having a pattern of deposited hydrophobic polymer on one side, while the other side contains little or essentially no deposited hydrophobic polymer.

By varying the parameters of the process as described above, it is possible to produce gas diffusion media having a wide range of hydrophobic patterns for use in fuel cells.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 illustrates a pattern member and sheet material of the invention;

FIG. 2 illustrates another embodiment of the invention;

DETAILED DESCRIPTION OF THE PREFERRED EMBODIMENTS

Figure 3A:
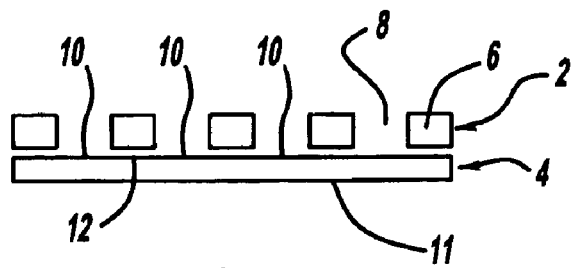
FIG. 3 is a cross-sectional view of an open mold.

The following description of the preferred embodiment(s) is merely exemplary in nature and is in no way intended to limit the invention, its application, or uses.

A method for depositing a polymer on a sheet material in a pattern comprises wetting the sheet material with a polymer dispersion containing a solvent and a polymer. After the sheet material is dipped into the polymer dispersion, the sheet material is then contacted with a pattern member that contains openings corresponding to the pattern. Thereafter, the solvent is evaporated from the wet porous sheet material while the sheet material is still in contact with the pattern member. The solvent leaves the sheet through the pattern member at the openings. In this way, polymer is deposited onto the sheet, predominantly at the openings.

In a preferred embodiment, a method for depositing a hydrophobic polymer onto a sheet of carbon fiber paper is provided. Preferably, the hydrophobic polymer is deposited onto the carbon fiber paper in a pattern representing less than 100% coverage of the carbon fiber paper sheet by the hydrophobic polymer, for example, 50%–99% coverage. In other embodiments, polymer such as hydrophobic polymer may cover 10%–90% of the area of the sheet, preferably 10%–60% or 10%–50%. The method includes wetting the sheet of carbon fiber paper in an aqueous emulsion of hydrophobic polymer, followed by contacting the wet sheet with a pattern member before the solvent from the aqueous emulsion of hydrophobic polymer is completely evaporated. The pattern member comprises one or more openings oriented to correspond to the pattern of polymer coverage on the carbon fiber paper. The water is then evaporated from the carbon fiber paper sheet while the sheet is still in contact with the pattern member. As a result, hydrophobic polymer is concentrated on the carbon fiber paper at locations corresponding to openings in the pattern member.

In another preferred embodiment, the process of contacting the sheet with a pattern member while the sheet is still wet with solvent is accomplished by a process of hot pressing. In a preferred embodiment, a sheet of carbon fiber paper is dipped into a hydrophobic polymer dispersion with an aqueous emulsion comprising water and hydrophobic polymer particles. While the carbon fiber paper sheet is still wet with water, the sheet is contacted with a pattern member by a process of hot pressing, and water is evaporated from the sheet while the sheet is in contact with the pattern member.

Sheet material such as carbon fiber paper having polymers such as hydrophobic polymers deposited on it in a pattern is useful for example as diffusion media in fuel cells. Such fuel cells contain an anode and a cathode with a proton exchange membrane disposed between the anode and the cathode. During operation of the fuel cell, water is produced at the surface of the cathode. The diffusion medium is disposed in contact to the anode and cathode catalyst layers in order to perform a variety of functions useful in water management and reactant gas transportation in the fuel cell.

The sheet material for use in the invention is in general a porous 2-D flexible material that may be wetted by water or other solvents associated with solutions of polymers as described below. In one embodiment, the sheet material may be made of a woven or non-woven fabric. Such fabrics are made of fibers that are capable of being wetted by the polymer solutions. If necessary, a surfactant or wetting agent may be added to the polymer solution to enable the polymer and the solvent to wet on the fibers.

In a preferred embodiment, the sheet material is made of a carbon fiber paper. Carbon fiber papers may be thought of as a non-woven fabric made of carbon fibers. Carbon fiber paper is commercially available in a variety of forms. For example, the carbon fiber paper may have a density of from 0.3 to 0.8 g/cm$^3$ and thicknesses of from 100 µm to 500 µm. Suitable carbon fiber papers for use in fuel cell applications as described below are available from Toray Industries USA. An example of commercially available carbon fiber paper from Toray is TGP H-060, which has a bulk density of 0.45 gm/cm$^3$ and is approximately 180 micron thick.

The polymer used in the invention and deposited on the sheet material by the methods of the invention is one that will settle out of an emulsion or precipitate out of a solution under the evaporating conditions described below. Preferably, the polymer deposited onto the sheet material is one that will remain stably in contact with the portions of the sheet during conditions of its use in the eventual end application, such as a diffusion medium in a fuel cell. As discussed below, the compatibility or stability of the polymer in contact with the sheet material may be enhanced by certain post-curing where the coated sheet material is heated to a high temperature to fix the structure of the polymer on the sheet material.

In a preferred embodiment, the polymer used is one that will impart either a hydrophobic or hydrophilic character to the substrate sheet material where the polymer is deposited. The polymer renders the surface of the substrate hydrophobic if the surface free energy of the polymer material is less than the surface free energy of the sheet material itself. A polymer renders the surface of the substrate hydrophilic if the surface free energy of the polymer is greater than the surface free energy of the sheet material. Surface free energy of the polymer and the sheet material may be measured by and correlated to the contact angle of water in contact with the polymer or sheet material, respectively. For example, if the contact angle of water on the polymer is greater than the contact angle of water on the sheet material, then the polymer may be considered a hydrophobic material. If the contact angle of water on the polymer is less than the contact angle of water on the sheet material, the polymer may be considered as a hydrophilic polymer.

For certain applications such as for diffusion media in fuel cells, hydrophobic polymers are used. Non-limiting examples of hydrophobic polymers include fluororesins. Fluororesins are fluorine-containing polymers, made by polymerizing or copolymerizing one or more monomers that contain at least one fluorine atom. Non-limiting examples of fluorine-containing monomers that may be polymerized to yield fluorocarbon polymers include tetrafluoroethylene, hexafluoropropylene, vinylidene fluoride, perfluoromethyl vinyl ether, perfluoropropyl vinyl ether, and the like. The presence of fluorine carbon bonds is believed to be responsible for the hydrophobic nature of these resins. A specific example of a preferred fluorocarbon polymer or fluororesin is polytetrafluoroethylene (PTFE), a homopolymer of tetrafluoroethylene.

The polymers are applied to the sheet material by wetting the sheet material in a wetting composition including the polymer and a solvent. In some embodiments, the wetting composition may be provided in the form of an emulsion. Solutions may also be used. In some embodiments, the wetting compositions contain surface active materials or other agents to hold the polymer in solution or suspension, or to aid in wetting the sheet material. For example, an emulsion used to wet the sheet material may include from 1 to about 70 wt. % particles of a hydrophobic polymer such as polytetrafluoroethylene. In other embodiments, ranges of 1%–20% are preferred. In a preferred embodiment, the polymer composition contains approximately 2% to 15% of the polymer solids by weight. As noted above, the polymer composition may contain surface active agents or wetting agents in addition to solvents such as water and polymer particles such as polytetrafluoroethylene particles.

Wetting of the sheet material is accomplished by exposing the sheet material to the wetting composition for a time and at a polymer concentration selected so as to deposit a desired amount of polymer onto the sheet. For example, the sheet material may be dipped, immersed, or soaked in the wetting solution. Preferably, from about 1% to about 20% by weight polymer is deposited onto the sheet material based on the total weight of the polymer and sheet material, more preferably, about 2% to 15%, and more preferably, about 4% to 10%. The amount and pattern of polymer coverage may be varied according to how relatively hydrophobic or hydrophilic the sheet material is, the hydrophobic or hydrophilic nature of the deposited polymer, and the desired percentage coverage of the sheet material with deposited polymer, all taken in view of the requirements of the end application. In a non-limiting example, a carbon fiber paper containing about 7% by weight deposited polymer such as PTFE or other fluororesin, fluorocarbon polymer or hydrophobic polymer has been found satisfactory for use in a fuel cell.

The pattern member is so called because it is made of a relatively rigid framework material having openings defining a pattern in which the polymer will be deposited on the sheet material. The openings in the pattern member may be provided in the form of holes, perforations, slots, or other shapes, and may be produced in the pattern member by any suitable punching, cutting, or other process. In other embodiments, the pattern member may be provided in the form of a screen having a pattern of holes or openings in one or two dimensions. A pattern member in the form of a screen may take the shape of a perforated plate or a meshed wire fabric. Non-limiting examples include perforated sheet iron and perforated stainless steel screens. Generally, the openings may make up 10%–90% of the area of the screen to be put into contact with the sheet. In other embodiments, the openings may make up 10%–60% or preferably 10%–50% of the screen contact area. In another embodiment, the pattern member may be provided in the form of a plate or an essentially planar member. The pattern member may be planar or it may be slightly curved. In any case, the pattern member is adapted to be pressed against the sheet material during a subsequent evaporative step described below.

In another embodiment, the pattern member may be cylindrical. In this embodiment, the cylindrical pattern member may be adapted to produce a pattern of coating on a sheet material by a process of hot rolling. In this embodiment, a portion of the cylindrical pattern material is first pressed against a sheet material. High temperature or other conditions are applied to evaporate solvent from the sheet material while the sheet material is in contact with the cylinder. The cylinder is rolled across the sheet at a rate slow enough that evaporation happens while the cylindrical pattern member is momentarily in contact with the sheet material. A wetted sheet material may be continuously fed into an apparatus containing such a rolling cylindrical pattern member.

Preferably, the material from which the framework material of the pattern member is constructed should be impervious to water or other solvents, and should preferably be heat conductive to promote evaporation of the solvent discussed below. When in contact with the sheet material, the openings in the pattern member define evaporation pathways for solvent to escape from the porous sheet material held in contact with the pattern member.

When the sheet material is still wet, an evaporation step is carried out by contacting the pattern member with the sheet material and applying evaporating conditions. In a preferred embodiment, the sheet material is heated while in contact with the pattern member. In other embodiments, a vacuum may be pulled to evaporate the solvent, or air or other gas may be blown across the surface of the sheet material while in contact with pattern member to facilitate evaporation. Drying can also be accomplished by using microwave or infrared radiation to heat the material and evaporate the solvent. Combinations of such evaporating conditions may also be employed.

When the sheet material is heated to evaporate the solvent, the speed of evaporation is a function of the temperature. The drying temperature will affect the drying rate, but it will not affect in-plane PTFE distribution (i.e., the pattern itself). but will affect the through-plane distribution. e.g. fast dry will tend to pull PTFE to the paper surface at the openings, slow dry will result in more PTFE in the paper cross section or bulk at the openings. By choosing a suitable combination of conditions such as temperature, vacuum, and streams of gas, it is possible to select conditions where the solvent evaporates at an acceptable rate and thus generate the desired cross-sectional PTFE distribution.

In one embodiment, the pattern member is contacted with the sheet material in a mold that may or may not contain openings—some embodiments are illustrated in the figures. In another preferred embodiment, the pattern member may be contacted with a sheet material by a process of hot pressing. In such a process, the pattern member is preferably heated before coming into contact with the sheet member. The hot pressing member may be in the form of a plate, a curved material or a cylinder such as described above. The hot pressing technique is especially suitable for adaptation to continuous or high throughput processes.

During the drying or evaporation step, the polymer particles such as PTFE particles move with the solvent and settle down at the place where the solvent evaporates from the substrate. The pattern member is prepared in such a way that an open hole or slot is cut where a relatively high content of deposited polymer is required on the sheet material. The sheet material may be dipped or otherwise exposed to the polymer solution and the wet sheet material such as carbon fiber paper may be placed between two identical and mirror image pattern molds. Alternatively, the sheet material may be contacted by a mold or pattern member having a different pattern design on either side of the sheet material. In yet another alternative, one side of the sheet material may be put in contact with a pattern member and the other side exposed to a closed block. These and other embodiments are further illustrated in non-limiting examples by way of the figures.

In this way, PTFE particles or other polymer particles are deposited onto the sheet material most heavily at the places where the solvent evaporates from the sheet material. The deposition locations correspond to the openings in the pattern member. Locations on the sheet material in contact with the solid portions of the pattern member (i.e., not the openings) may have a detectable amount of polymer deposition, but it will be significantly less than at the openings.

After the solvent has been evaporated and the polymer deposited on the sheet material in a desired pattern, it is usually desirable to carry out a further post-curing or sintering step. This post-curing is generally accomplished by heating to a relatively high temperature for a time sufficient to accomplish the curing. In the case of fluorocarbon polymer coatings such as polytetrafluoroethylene, it generally suffices to heat to a temperature of about 380° C. In general, it is preferred to heat any such polymer coating around its melting or softening temperature. The softening allows more intimate contact of the polymer with the fabric of the sheet material. Before sintering, the particles are deposited in the same shape as they are in the suspension. It is believed that the sintering step transforms the individual particles into a substantially continuous layer with crystallite structure. The layer affects the wetting behavior. The patterns deposited on the fabric during the drying step are not changed by the high temperature curing. Thus the pattern formation step may be carried out at a relatively low temperature, providing a low cost method.

FIG. 1A shows a pattern member 2 of the invention made of a solid portion or impermeable part 6 defining openings 8 in the pattern member 2, here illustrated as a series of slots 8. FIG. 1B shows a cross-section of pattern member 2 showing the solid portion 6 and the opening 8. FIG. 1C illustrates a sheet material 4 made by contacting the pattern member 2 with a porous fabric according to the method of the invention. The sheet 4 contains areas 10 that correspond to locations held adjacent openings 8 in the pattern member, and contact areas 12 correspond to locations held adjacent to solid portions 6 of the pattern member. Polymer is deposited onto the sheet primarily at the open areas 8.

FIG. 2A shows a perspective drawing of another embodiment of a pattern member 2, here illustrated as a solid portion 6 in the form of a screen having openings 8 in the form of holes in a two dimensional pattern in the pattern member.

FIG. 2B shows a porous fabric 4 having polymer primarily deposited on open areas 10 whereas little or no polymer is deposited on contact areas 12.

Figure 3B:
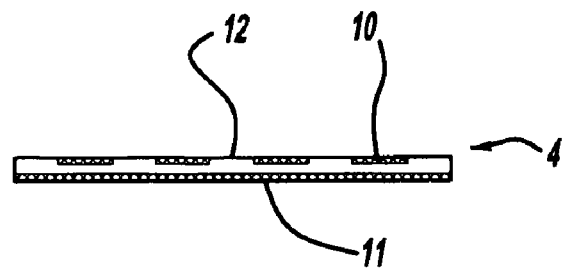

FIG. 3A shows a cross-section of a pattern member 2 in contact with a porous fabric 4. Pattern member 2 is made of solid portion 6 having openings 8 defining evaporation paths for the solvent in the porous fabric 4. The porous fabric 4 contacts the pattern member at contact areas 12, leaving open areas 10 of the porous fabric not in contact with the pattern member. In the embodiment illustrated in FIG. 3A, the opposite side 11 of the porous fabric 4 is not in contact with the pattern member during the evaporation step. FIG. 3B illustrates in schematic form the structure of a porous fabric of 3A after the evaporation step. FIG. 3B shows the polymer deposited onto the porous fabric 4 predominantly at locations corresponding to open areas 10 and opposite side 11 of the porous fabric of FIG. 3A. On the other hand, at locations 12 on the porous fabric corresponding to where the porous fabric was in contact with the pattern member during evaporation, little or no polymer is deposited.

Figure 4A:
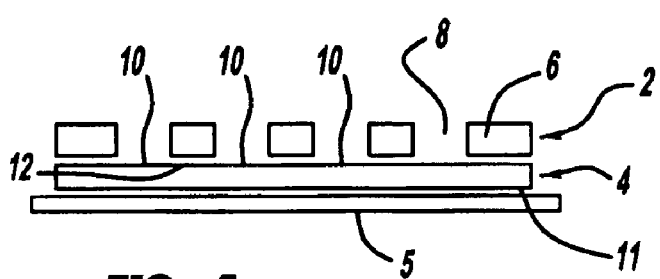
FIG. 4 is a cross-sectional view of a closed mold application.
Figure 4B:
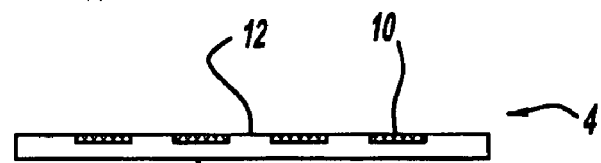

FIG. 4A shows a porous fabric of the invention in contact with a pattern member 2 on one side and a solid mold surface 5 on the other. FIG. 4B shows the pattern of polymer deposition on the porous fabric of 4A after the evaporation step. The side in contact with the pattern member shows polymer deposits at locations 10 whereas no polymer is deposited at locations 12. Also, the opposite side 11 of the porous fabric contains little or no deposited polymer, as it was in contact with a mold surface during the evaporation step and there were consequently no evaporation paths provided from the opposite side.

Figure 5A:
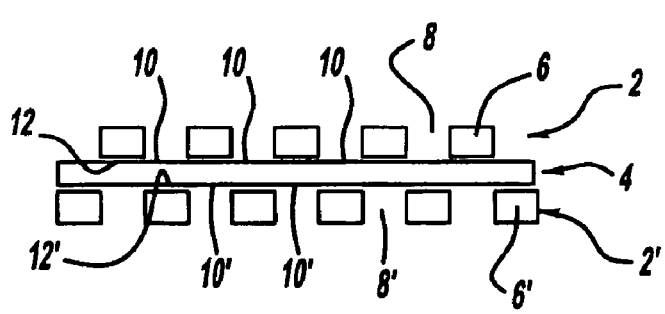
FIG. 5 is a cross-sectional view of a double-sided mold.
Figure 5B:
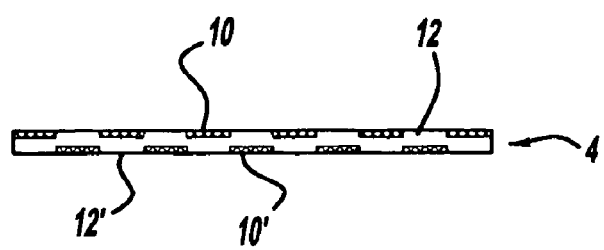

FIG. 5A illustrates in schematic form a porous fabric 4 in contact with a pattern member 2 on one side and a pattern member 2' on the other. The pattern member 2' on the opposite side of the porous fabric is made of solid portion 6' and openings in the pattern member 8'. The porous fabric 4 is in contact with the pattern member during the evaporation step at locations 12 and 12', while locations 10 and 10' of respective pattern members 2 and 2' are not in contact during the evaporation step. FIG. 5B illustrates the porous fabric having deposited polymer such as produced in FIG. 5A by evaporation. Polymer is deposited on the porous fabric 4 at locations 10 and 10' corresponding to the open areas of FIG. 5A. Furthermore, there is little or no polymer deposited at locations 12 and 12' corresponding to the contact area between the fabric and the pattern member during the evaporation step.

EXAMPLES

Example 1

A pattern member in the form of a screen is provided having a series of holes in a stainless steel sheet such that the area of the holes makes up about 20 to 63% of the total surface area of the pattern member. Such screens are commercially available, for example from McMaster-Carr. A sheet of carbon fiber paper (for example Toray TGP H-060, Toray, Japan) is soaked in a 3 wt % solution of polytetrafluoroethylene for 4 minutes. The 3 wt % PTFE solution is prepared by a 20:1 dilution of a 60 wt % DuPont T-30 solution. The carbon fiber paper is then placed in contact with the pattern member and dried at 120° C. for 0.5 hours. At this point, there is approximately an 8.2 wt % uptake, which is generally made of PTFE and surfactants in the commercial solution. After solvent removal, the paper is removed from contact with the pattern member and cured at 380° C. for 20 minutes. After the curing step, there remains approximately a 7 wt % uptake of PTFE.

Example 2

Figure 6:
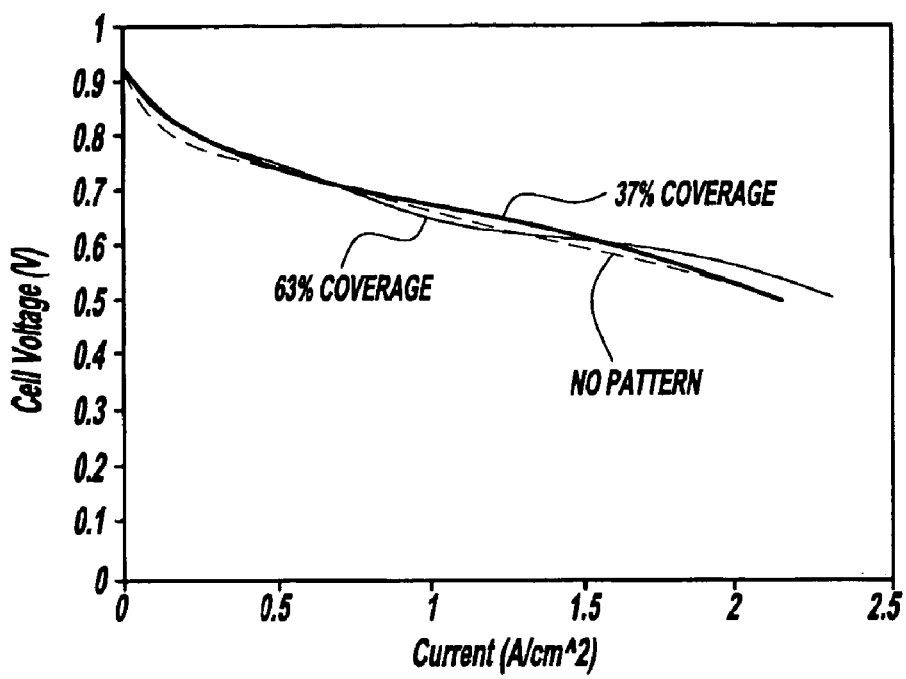
FIG. 6 is a graph of cell performance at relatively low gas inlet humidity.

An electrochemical fuel cell was prepared in which the anode catalyst layer was in contact with a sheet of Toray TGPH-060 carbon fiber paper containing 7 wt. % PTFE applied without use of a pattern member. In three different cells, a diffusion medium was provided adjacent to the cathode that contains 1) no pattern of PTFE but containing 7 wt. % total of PTFE, 2) a carbon fiber paper containing 7 wt. % PTFE with mirrored patterns on both sides of the paper, and wherein the PTFE covers 37% of the area of the paper and are present as dots of 0.045 inch diameter; and 3) a carbon fiber paper having 7 wt. % PTFE with mirrored patterns on both sides, wherein the PTFE covers about 63% of the area of the paper and is present as dots of 0.156 inch diameter. A first experiment was carried out to evaluate gas diffusion media performance under fairly dry conditions, and the polarization curves are shown in FIG. 6 This experiment and the one described below were conducted on a single-cell fuel cell with 50 cm$^2$ active area. The cell was operated under the following conditions: 80° C., 50 kPa gauge, 100% H$_2$ feed to anode at 2.0 stoichiometry, air feed to the cathode with 2.0 oxygen stoichiometry, 70° C. dew point of feed streams. It can be seen that under these conditions, the cells having the patterned diffusion media prepared by the method of the current invention have equivalent performance to the cell provided with a diffusion medium having PTFE but with no pattern.

Figure 7:
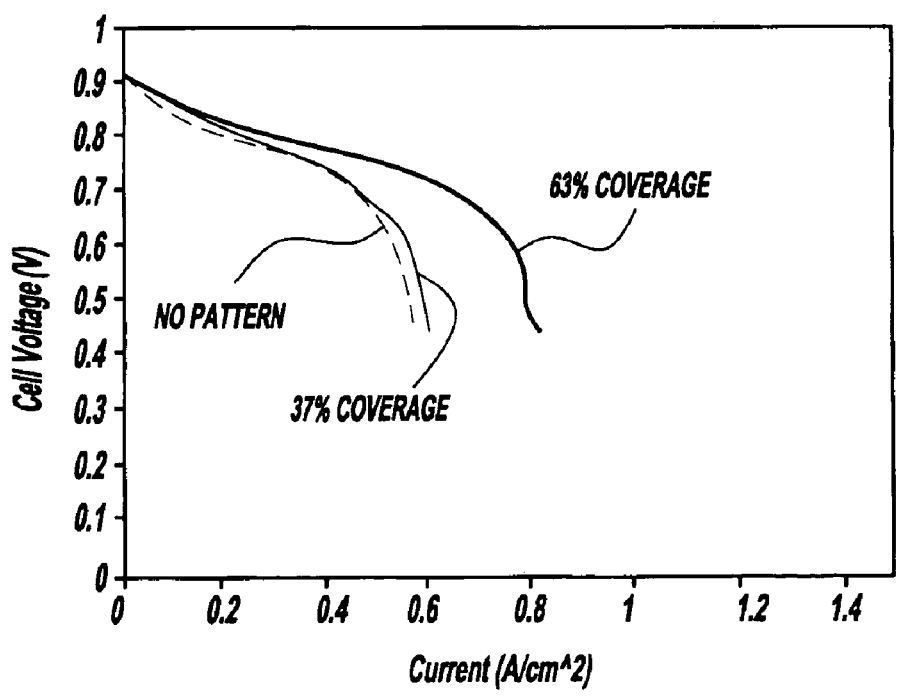
FIG. 7 is a graph of cell performance at relatively higher gas inlet humidity.

A second experiment was carried out to evaluate gas diffusion media performance under very wet conditions, and the polarization curves are shown in FIG. 7. The cell was operated under the following conditions: 60° C., 170 kPa gauge, 100% H$_2$ feed to anode at 2.0 stoichiometry, air feed to the cathode with 2.0 oxygen stoichiometry, 80° C. dew point of feed streams. Here, it is seen that the cell with the cathode diffusion media with 37% coverage of PTFE (made of 0.045 inch diameter dots) had about the same performance as the cell with the diffusion medium having 7 wt. % PTFE but with no pattern. On the other hand, a fuel cell having a cathode diffusion medium with 63% coverage (made of 0.156 inch diameter dots) performed better. Fuel cell performance under wet conditions can be achieved by fine tuning the PTFE pattern in order to achieve the best balance of product water rejection properties reactant gas transport properties.

As can be seen from the foregoing description and experiments, the present invention provides a diffusion media made by a process that provides a desired pattern. More specifically, the diffusion media is optimized for combination with a bipolar plate in a fuel cell. The bipolar plate comprises a plurality of lands and grooves, the openings of the pattern member correspond to the lands or grooves or any other feature. Although the invention in its preferred embodiment provides a method for dispersing polymer on diffusion media in a desired pattern to provide a desired hydrophobic loading in one area as compared to another area, the invention is also usable to dispose polymer on diffusion media in any desired pattern. For example, the method in its most general embodiment provides a method for making diffusion media with polymer deposited on a portion of the diffusion media by wetting the diffusion media with the solution comprising a solvent and polymer and then contacting the sheet with a pattern member having a predetermined pattern and then evaporating the solvent from the sheet while the sheet is in contact with the pattern member. More specifically, the diffusion media is optimized for combination with a bipolar plate in a fuel cell. The bipolar plate comprises a plurality of lands and grooves. In the case where the pattern member comprises parallel channels, the open channels of the pattern member may correspond to land areas or groove areas. Thus, the polymer loading may be controlled to be higher in the land areas or higher in the groove areas. As can be seen, the method of the invention provides the ability to prepare a fuel cell comprising a patterned GDM with different fluorocarbon polymer content which matches the bipolar plate's lands and grooves. In another case, during the fuel cell operation, more water is accumulated around the gas outlet area although the gas inlet area is fairly dry and further humidification of the reactant gas would be desired. A more desirable option might be to use a pattern that produces a diffusion media with a relatively sparse coverage of hydrophobic fluorocarbon polymer around the gas inlet area and dense coverage of hydrophobic fluorocarbon polymer on the gas diffusion media around the gas outlet area.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for depositing a polymer on a porous sheet material in a predetermined pattern comprising:
    wetting the porous sheet material with a polymer composition comprising a solvent and a hydrophobic polymer;
    while it is still wet, contacting the wet porous sheet material with a pattern member containing openings corresponding to the predetermined pattern; and
    evaporating the solvent from the wet porous sheet material while in contact with the pattern member
    wherein the evaporating causes movement of the polymer across the porous substrate to areas of the substrate corresponding to the openings of the pattern member.

2. A method according to claim 1, wherein the porous sheet material comprises carbon fiber paper.

3. A method according to claim 2, wherein the carbon fiber paper has porosity greater than 50%.

4. A method according to claim 1, wherein the hydrophobic polymer comprises a fluorocarbon polymer.

5. A method according to claim 4, wherein the fluorocarbon polymer comprises polytetrafluoroethylene.

6. A method according to claim 1, comprising contacting the porous sheet material on one side only with the pattern member.

7. A method according to claim 1, comprising contacting the porous sheet material on both sides with a pattern member.

8. A method according to claim 1, wherein the pattern comprises 50–99% coverage by the hydrophobic polymer on the porous sheet material.

9. A method of fabricating a fuel cell comprising making diffusion media by a process according to claim 1 and incorporating the diffusion media into a fuel cell.

10. A method of fabricating a fuel cell according to claim 9, wherein the fuel cell has a bipolar plate comprising a plurality of lands and grooves with the openings of said pattern member corresponding to said grooves.

11. A method according to claim 10, wherein the fuel cell has a bipolar plate comprising a plurality of lands and grooves with the pattern member defining in said grooves a hydrophobic polymer content different from the hydrophobic polymer content of said lands.

12. (previously presented )The method of claim 9 wherein the fuel cell has a gas inlet area and gas outlet area wherein there is greater hydrophobic polymer loading on the diffusion media adjacent or in said gas outlet area than in said gas inlet area.

13. A method for depositing fluorocarbon polymer onto a sheet of carbon fiber paper in a predetermined pattern representing less than 100% coverage of the sheet by the fluorocarbon polymer, the method comprising:
    wetting a sheet of carbon fiber paper with solvent in an aqueous emulsion of fluorocarbon polymer;
    contacting the wet sheet with a pattern member comprising one or more openings orientated to correspond to the predetermined pattern; and evaporating the solvent from the sheet while in contact with the pattern member so that the fluorocarbon polymer is concentrated on the sheet at the openings.

14. A method according to claim 13, wherein the fluorocarbon polymer comprises polytetrafluoroethylene.

15. A method according to claim 13, wherein the contacting step comprises holding the sheet between two mold surfaces, wherein at least one mold surface comprises openings through which the solvent can evaporate.

16. A method according to claim 15, wherein one mold surface comprises openings, and the other mold surface is solid.

17. A method according to claim 15, wherein both mold surfaces comprise openings, and wherein a pattern of fluorocarbon polymer is deposited on both sides of the sheet.

18. A method according to claim 13, wherein the pattern member comprises a screen.

19. A method according to claim 13, wherein evaporating is accomplished by heating the sheet to remove solvent.

20. A method according to claim 13, wherein at least one side of the sheet is coated over 10–90% of its area with fluorocarbon polymer.

21. A method according to claim 20, wherein at least one side of the sheet is coated over 10–60% of its area with fluorocarbon polymer.

22. A method according to claim 20, wherein at least one side of the sheet is coated over 10–50% of its area with fluorocarbon polymer.

23. A method for making diffusion media with polymer deposited on a portion of the diffusion media, comprising:
wetting a sheet of diffusion media with a solution comprising a solvent and polymer;
contacting the sheet with a pattern member having a predetermined pattern; and
evaporating solvent from the sheet while the sheet is in contact with the pattern member,
wherein the evaporating causes movement of the polymer across the porous substrate to areas of the substrate corresponding to the openings of the pattern member.

24. A method according to claim 23, wherein the diffusion media is carbon fiber paper; the polymer comprises fluorocarbon and the solvent comprises water.

25. A method according to claim 23, wherein the pattern member comprises a screen.

26. A method according to claim 25, wherein the screen comprises openings that make up 10–90% of the area of the screen.

27. A method according to claim 26, wherein the openings make up 10–60% of the area of the screen.

28. A method according to claim 26, wherein the openings make up 10–40% of the area of the screen.

29. A method according to claim 23, wherein the solution is an aqueous emulsion comprising 1–10 wt. % polymer in the form of particles.

30. A method according to claim 29, wherein the aqueous emulsion comprises 1–5 wt. % polymer in the form of particles.

31. A method according to claim 24 wherein the fluorocarbon comprises polytetrafluoroethylene and the method comprises delivering 1–20 wt. % polytetrafluoroethylene onto the carbon fiber paper, based on the total weight of the coated sheet.

32. A method according to claim 31, wherein 2–15% by wt. polytetrafluoroethylene is delivered onto the carbon sheet.

33. A method according to claim 31, wherein 4–10 wt. % polytetrafluoroethylene is delivered onto the carbon sheet.

34. A method of fabricating a fuel cell comprising making diffusion media by a process according to claim 23 and incorporating the diffusion media into a fuel cell.

35. A method for applying polymer on a porous sheet comprising:
wetting the sheet with a solution comprising a solvent and polymer;
contacting the wet porous sheet with a pattern member; and
evaporating water from the sheet while the sheet is in contact with the pattern member to vary polymer loading on the sheet corresponding to the pattern member,
wherein the evaporating causes movement of the polymer across the porous substrate to areas of the substrate corresponding to the openings of the pattern member.

* * * * *